United States Patent

[11] 3,622,278

[72] Inventors William E. Elzinga
Simpsonville;
William M. Kaufman, Chevy Chase;
Frederick B. Lobbin, Columbia, all of Md.
[21] Appl. No. 817,928
[22] Filed Apr. 21, 1969
[45] Patented Nov. 23, 1971
[73] Assignee to Hittman Associates, Inc.,
Columbia, Md.

[54] METHOD AND MEANS FOR BREATH ANALYSIS
14 Claims, 7 Drawing Figs.
[52] U.S. Cl. .................................................. 23/232 R,
23/254 R, 23/255 R
[51] Int. Cl. ........................................................ G01n 33/16
[50] Field of Search .......................................... 23/232,
254, 254 E, 255, 255 E; 73/23, 421.5

[56] References Cited
UNITED STATES PATENTS
3,196,689  7/1965  Forrester et al. .............. 23/232 UX Primary Examiner—Morris O. Wolk
Assistant Examiner—R. M. Reese
Attorney—Fleit, Gripple & Jacobson ABSTRACT: A method and means for measuring and analyzing the composition of alveolar air for determining the volatile constituents in blood. The method and apparatus of the present invention automatically eliminate the inclusion of air from the "dead air" spaces of the respiratory tract and thereby avoid dilution of the alveolar air, such dilution leading to inaccurate measurement of the relative concentration of the chemical constituent being examined.

INVENTORS
WILLIAM E. ELZINGA
WILLIAM M. KAUFMAN
FREDERICK B. LOBBIN

BY *Stevens, Davis, Miller & Mosher*
ATTORNEYS

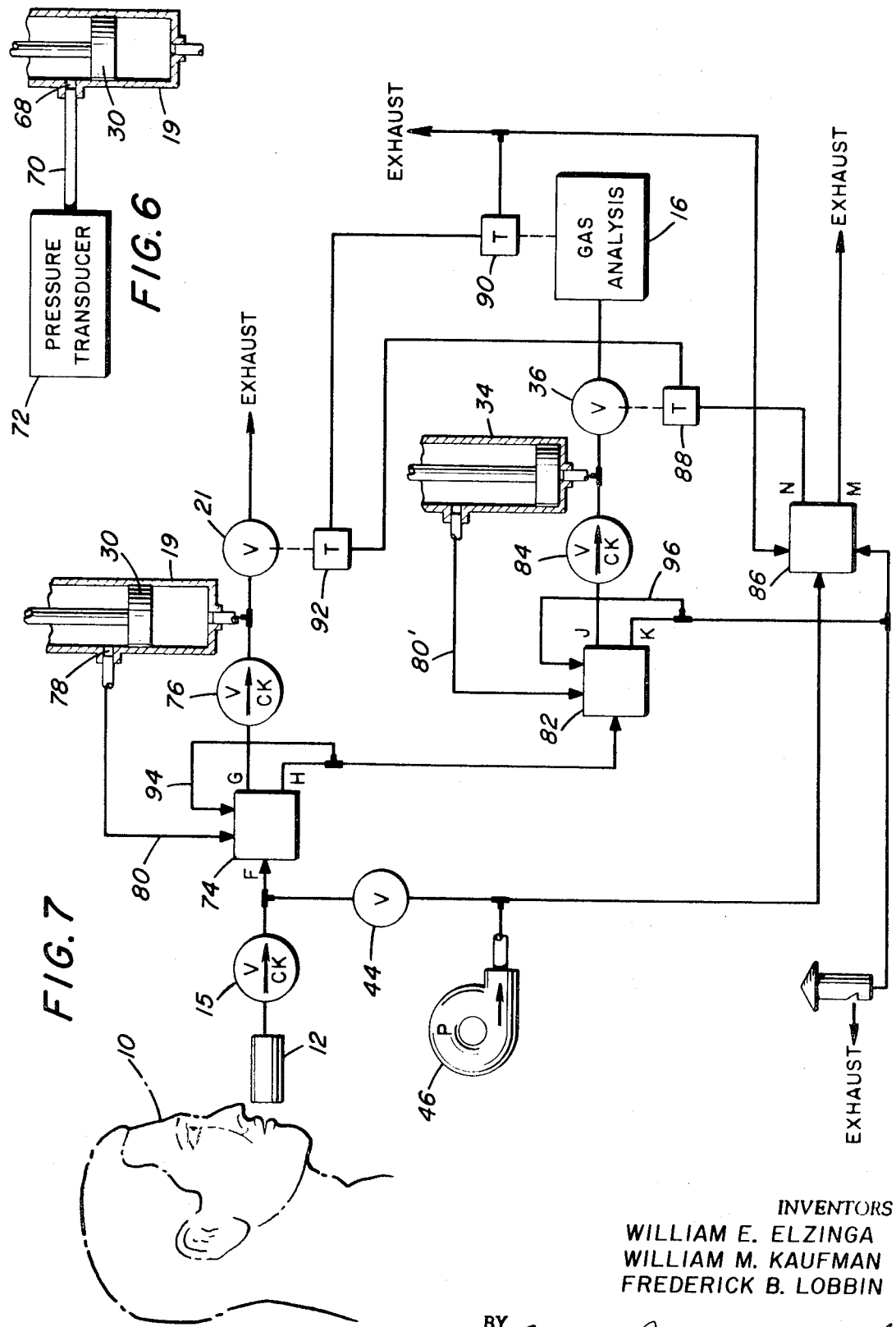

3,622,278

METHOD AND MEANS FOR BREATH ANALYSIS

BACKGROUND OF THE INVENTION

Biochemical tests for measuring the composition of alveolar air are used for determinations of the volatile constituents in blood. Well-known examples of such tests are the "drunkometer" test and the acetone test. Typical methods presently used for breath sample analysis include the steps of filling an expandable chamber, such as a balloon, plastic bag, syringe, or the like, by having the subject exhale into the chamber; withdrawing a sample from the collection chamber; and inserting the sample into a gas analysis instrument.

There are, however, numerous drawbacks associated with the prior art methods and apparatus for analyzing breath. The processes known to the prior art are usually carried out manually and therefore require extreme care in avoiding contamination or dilution of the sample with ambient air during the transfer of a sample from the collection chamber to the test instrument.

Also, in the methods and apparatus known to the prior art, air from the "dead air" spaces of the respiratory tract are customarily included in the sample of air to be tested. The term "dead air," as used herein, is the air from the mouth, throat, nasal passages and bronchial tubes of the subject. This air has not reached the necessary degree of saturation with blood components and should therefore be excluded from consideration in the performance of blood constituent tests. The inclusion of air from these "dead air" spaces dilutes the alveolar air and leads to inaccurate measurements of the relative concentration of the chemical constituent being examined.

And, in addition to the above, the prior art processes involve slow and laborious procedures and require trained operators for the interpretation of the output information from the gas analysis device.

SUMMARY OF THE INVENTION

The present invention relates to a method and apparatus for analyzing breath in order to determine the volatile constituents in the blood of a test subject. The method and device of the present invention accomplish this purpose in a manner which avoids many of the drawbacks inherent in the methods and devices known in the prior art.

The method of the present invention contemplates having a test subject breathe into a first collection chamber whose volume approximates the estimated "dead air" volume of the subject. After the first collection chamber is filled, the method contemplates having the subject fill a second collection chamber. The air in this second collection chamber, unadulterated alveolar air, is then fed to a gas analysis device for a determination of the volatile constituents in the blood of a test subject.

It is therefore one object of the present invention to provide a method for determining with accuracy the chemical constituents of blood.

It is another object of the invention to provide a method for analyzing the breath of a subject in an accurate manner.

It is yet a further object of the invention to provide a method for analyzing the breath of a test subject in such a manner that air from the "dead air" space of the subject is not included in the air under test.

The device of the present invention is provided with a pair of chambers for selectively housing the breath from a test subject. The first chamber is adapted to gather the "dead air" from the subject and, when this chamber is filled, a switch is activated and the breath from the subject is then passed to the second chamber. In this manner the "dead air" is separated from the unadulterated alveolar air, the unadulterated alveolar air from the second chamber being the only air reaching the gas analysis device.

It is therefore another object of the present invention to provide an apparatus for analyzing the breath of a test subject in such a manner that air from the "dead air" space of the test subject is segregated from the unadulterated alveolar air of the subject.

The present invention is also adapted to automatically pass the unadulterated alveolar air from the second chamber to a gas analysis device. In this manner, the critical step of manually transferring a sample of air from the collection chamber to the test instrument, a transfer necessitated by the devices of the prior art, is eliminated.

Further, the present invention contemplates automatic switching between the pair of gas-collecting chambers and the gas analysis device. Therefore, the present invention provides an apparatus which is substantially automatic; and, therefore, the human factor, with its associated inaccuracies, is substantially avoided. Also, by automating the breath analysis apparatus, the reproducibility of results is greatly enhanced.

The present invention further contemplates the provision of a system for flushing the chambers and gas tubes in order that there be no intermixing of air between successively tested subjects.

Finally, the present invention contemplates timing and gating circuits which automatically select the desired gas component pulse which is to be tested.

These and other objects of the invention, as well as many of the attendant advantages thereof, will become more readily apparent when reference is made to the following description taken in conjunction with the accompanying drawings.

BRIEF DESCRIPTION OF THE DRAWINGS

FIG. 6 is a drawing of a "dead air" chamber with an alternate embodiment of a volume-indicating means; and FIG. 7 is an alternate embodiment of the breath-analyzing device of the present invention.

DETAILED DESCRIPTION OF THE DRAWINGS

As noted above, it is the purpose of this invention to provide a method and means for obtaining a true alveolar air sample and for analyzing and reporting the results of such analysis in an automatic and reproducible fashion. The invention contemplates separating "dead air" from pure alveolar air, an automatic and reproducible sampling and analysis system, and a simple and reliable reporting mechanism.

Figure 1:
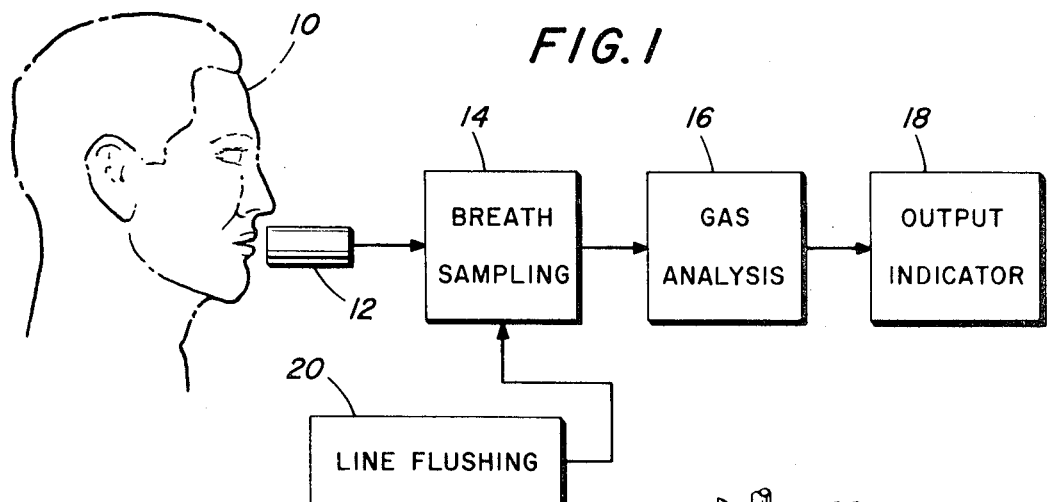
FIG. 1 is a block diagram of the breath analysis system of the present invention.

Referring first to FIG. 1, a block diagram of the breath analysis system of the present invention, the subject whose breath is to be sampled is indicated at 10. The subject 10 exhales into a mouthpiece 12 which feeds a breath-sampling device 14. As is explained below, the function of the breath-sampling device is to select and to collect alveolar air and to deliver a uniform sample size to a gas analysis device. The gas analysis device is indicated at 16 and performs an analysis of the chemical composition of the alveolar air sample for a given constituent or set of constituents, for example, acetone content. The information gathered by the gas analysis device 16 is presented to an output indicator 18 which presents the results of the analysis either numerically or, for simplicity, in the form of an indication of "positive" or "negative," relative to the critical value for medical diagnostic purposes, on the face of a meter. FIG. 1 also shows a line flushing apparatus 20 which serves to prevent cross-contamination between samples.

Figure 2:
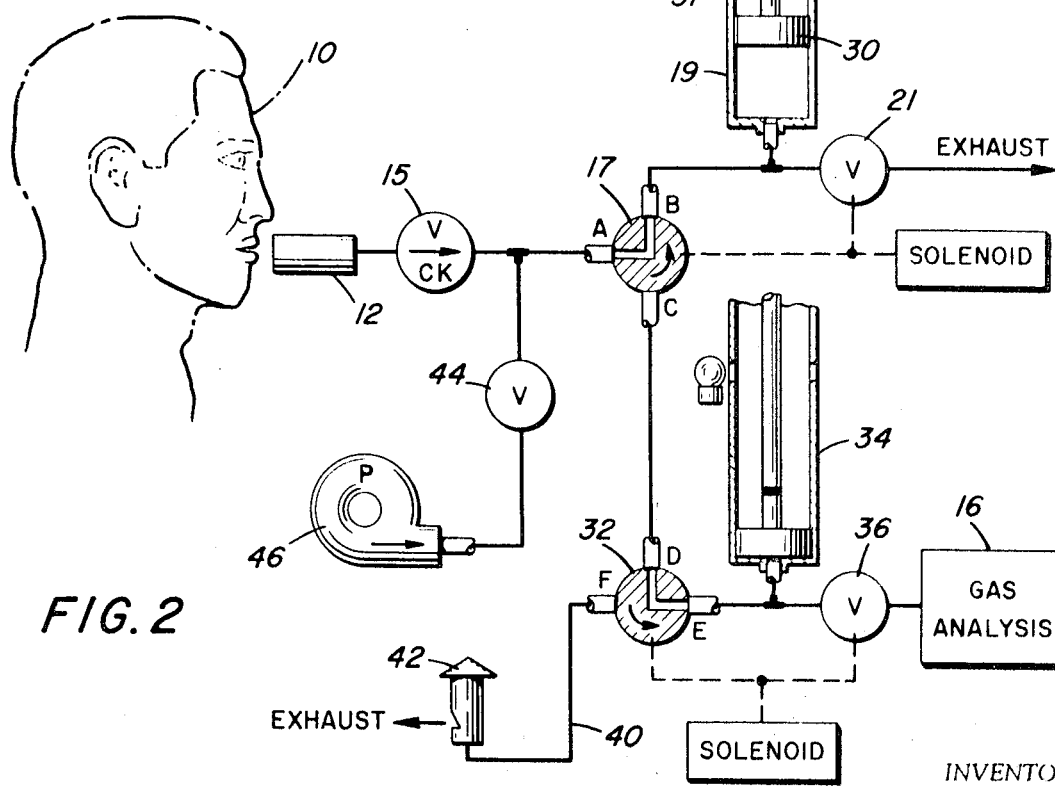
FIG. 2 is a schematic drawing of a first embodiment of the breath analysis system of the present invention.

With reference now to FIG. 2, the breath-sampling device 14 is more fully explained. As noted above, the subject 10 exhales into a mouthpiece 12. The air exhaled by the subject passes through a check valve 15 and then reaches a selector valve 17. The selector valve 17 can be any of a known variety of valves having an input and a pair of output ports. In FIG. 2, the input port is designated as A and the output ports are designated as B and C, respectively. When the subject 10 exhales into mouthpiece 12, the valve 17 is set for continuity from port A to port B so that the air passes into a collecting chamber 19. Chamber 19 is expandable, for example, by means of a piston 30 so that it can be filled with a predetermined quantity of air. When the chamber 19 expands to the desired volume, the selector valve 17, simultaneously with a valve 21, is activated, the result being that there is then continuity between ports A and C and that valve 21 is open.

The chamber 19 is designed so that it will hold a quantity of air equal to the estimated quantity of "dead air" appropriate for the particular subject under test. In FIG. 2, there is shown one possible means for the operator to detect when the chamber 19 is filled to the desired level. This means consists of a light source 22 on one side of the chamber 19. The light from the source 22 passes through a port 24 and illuminates the internal region of the chamber 19. The operator can monitor the internal workings of the chamber by peering through a second port 26 on the opposite side of chamber 19. The eye of the operator is shown at 28.

In operation, the piston 30 associated with the chamber 19 is raised until the eye 28 sees an indicator mark 31 which is illuminated by the light source 22. Once this visual indicator is seen, the operator simultaneously switches valves 17 and 21 so that, as explained above, valve 17 is continuous from port A to port C and valve 21 is in its open position.

When the selector valve 17 is continuous from port A to port C, then the breath from the subject 10 passes to a second selector valve 32, valve 32 then having continuity from port D and Port E. With the second selector valve 32 in the position indicated above, the air from the subject 10 passes toward a second collection chamber 34. In order to insure that all of the air from the subject reaches the collection chamber 34, a valve 36, located intermediate the second selector valve 32 and a gas analysis device 16, is in its closed position.

Once the second collection chamber 34 is filled to the desired level, this level being detected in a manner similar to that described with reference to collection chamber 19, valves 32 and 36 are simultaneously manipulated so that valve 32 has continuity from port D to port F and valve 36 is in its open position. The breath from the subject is then directed to an exhaust 40 on which an audible indicator 42 may be used to notify the subject that he may discontinue exhaling. The pure alveolar air sample is, in the manner described above, trapped in chamber 34 (the "dead air" being trapped in chamber 19) and can be delivered to the gas analysis device 16 through the now open valve 36.

After a breath sample analysis operation, the entire system is flushed by opening a valve 44 and by operating a pump 46. The open valve 44 and its associated pump 46 force air through the apparatus in the same manner as was employed when the breath was collected. If desired, the flushing air could be directed to bypass the gas analysis device through an additional valve (not shown).

As noted above, the apparatus shown in FIG. 2 separates alveolar air from "dead air" by the proper selection of the volume of chamber 19 and appropriate switching operations. As long as chamber 19 is large enough to collect all the subject's "dead air," then chamber 34 will contain only alveolar air. It is contemplated by the present invention that the volume of chamber 19 be large enough to adequately house all of the "dead air" from any subject tested. However, the position of the visual indicator could be made adjustable so that the volume of the chamber 19 could be adjusted to the expected "dead air" volume of a particular subject. That is, a table could be provided for the operator which correlates "dead air" volume with the subject's height and weight.

It should here be noted that valve pairs 17 and 21, and 32 and 36, can be operated either manually, mechanically, by means of electromechanical solenoids or other well known means.

The gas analysis portion of the system shown in FIG. 2 may consist of any conventional gas analyzer such as a gas chromatograph. Naturally, the analyzer must be incorporated into the system of the present invention by proper interconnections with the breath-sampling apparatus. Because of the nature of the gas chromatograph, it is possible to tailor the operational parameters to be most efficient for one specific gas component. Therefore, if the breath analysis apparatus is to be used to test for one specific component, such as acetone, the column material, inlet temperature, and oven temperature can be properly selected by chemists skilled in the art of gas chromatography to optimize the speed and sensitivity of analysis.

The output signal from a gas chromatograph is an electrical potential which varies with time. As the various constituents of a breath sample are separated physically within the column they proceed through the column and emerge at various times. The electrical signal is proportional to the instantaneous rate of gas emerging from the column. Thus, each electrical pulse corresponds to a gas constituent emerging from the column. An integral of voltage amplitude over time for each pulse is therefore proportional to the quantity of that constituent in the original sample. Therefore, an output indicator that is useful for medical diagnosis is one which integrates only the pulse of interest and displays either a numerical valve of that integral or indicates whether that integral is greater or less than some previously chosen value.

Figure 3:
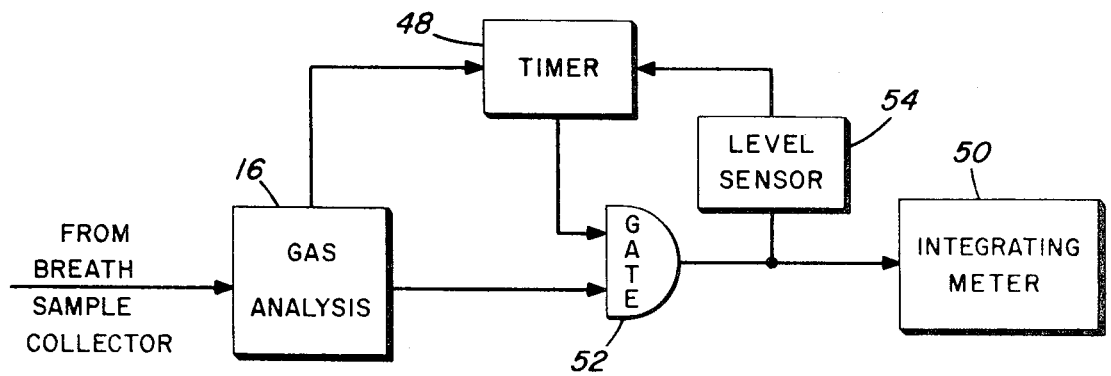
FIG. 3 is a block diagram of the readout circuit associated with the device of the present invention.

With reference than to FIG. 3, there is shown a simplified block diagram of a system for indicating the integral of the pulse of interest. When the gas analysis device 16 receives a gas sample from the breath sample collector 34, an electrical trigger signal is emitted from the gas analysis device which serves to initiate a timer 48. Timer 48 provides an electrical gating signal which permits the electrical output of the gas analyzer 16 to be directed to an integrating meter 50. Since a specific gas, such as acetone, emanates from the chromatograph column at a predetermined time, the timer 48 is set to open a gate circuit 52 only at a time when the desired gas is leaving the column and is being sensed by the chromatograph detector. Also provided is a level-sensing circuit 54 which emits a trigger pulse when the output of the chromatograph reaches the base line signifying the completion of the pulse. The trigger pulse from the level sensor 54 resets the timer and thereby closes the gate circuit 52.

The timer 48 is most conveniently a scaler which counts down from any convenient stable signal source, such as a utility powerline. The level-sensing circuit 54 is conveniently a Schmitt trigger circuit well known in the art. The gate circuit 52 can take the form of any of a numerous variety of well known gate circuits. The integrating meter 50 is a conventional direct current ammeter without restoring spring. Therefore, if such a meter is designed to have linear damping and negligible static friction, the angular motion resulting from a current pulse is proportional to the integral of current overtime. This principle is employed in conventional fluxmeters and is well known in the art.

Figure 4:
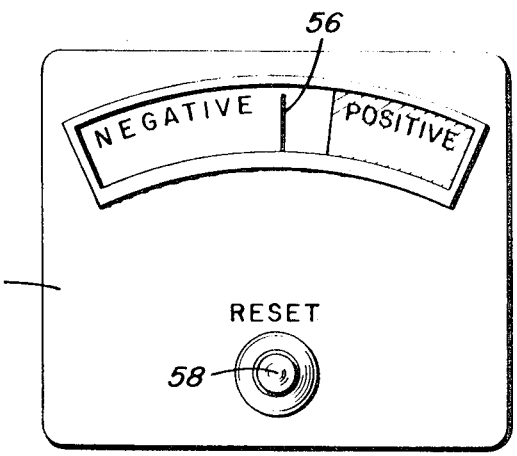
FIG. 4 is a view of the face of a meter which could be used in conjunction with the present invention.

One possible arrangement for the face of the integrating meter 50 is shown in FIG. 4. The meter needle 56 rotates to an angle proportional to the time integral of the output pulse corresponding to the gas constituent of interest. A reset button 58 is provided on the meter and sets the needle on its starting position at the extreme left of the scale before each breath analysis begins. Rotation of the needle 56 will be upscale, and, if the quantity of gas represented by the selected pulse exceeds the predetermined critical value, the indicator needle will pass into the "positive" portion of the scale indicating a positive test result. If, however, the quantity of gas represented by the selected pulse does not exceed the predetermined critical value, the needle swing will terminate in the "negative" portion of the scale. As noted above, the meter is reset prior to each test by means of button 58 which may, for convenience, be made automatic by interlocking the reset action with the operation of valves 17, 21, 32 and 36 (FIG. 2).

Figure 5:
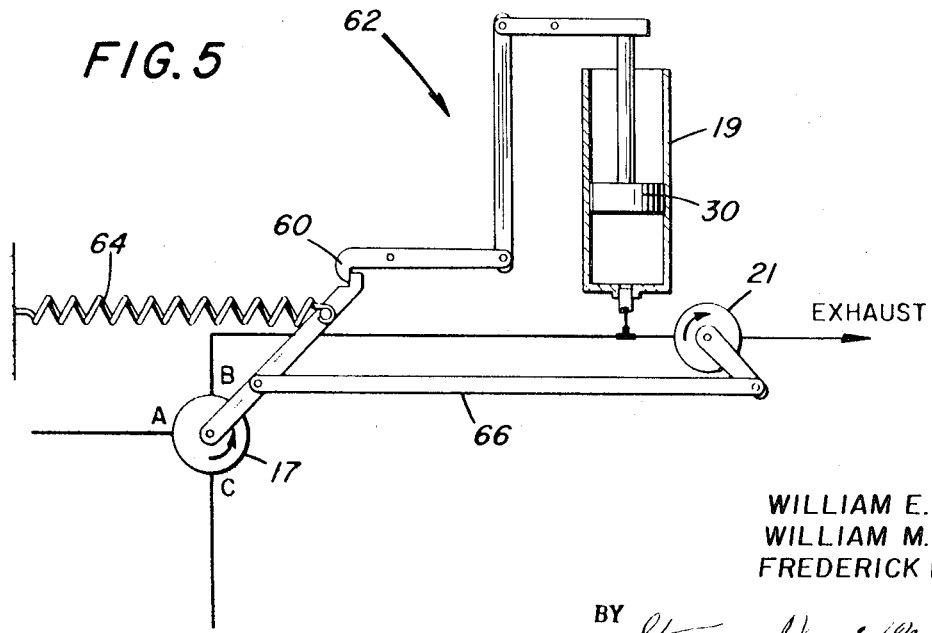
FIG. 5 is a schematic representation of an automatic switching system which is adapted for use with the device of the present invention.

As mentioned above, it is one object of the present invention to automate the operation of the breath-sampling apparatus. With reference then to FIG. 5, there is shown an apparatus which mechanizes the above-described switching operation associated with valve pair 17 and 21 (FIG. 2). When the piston 30 of the air-collecting chamber 19 reaches a predetermined height, a detent 60 releases and causes, through the means of linkages 62 and spring 64, the selector valve 17 to switch from continuity between ports A and B to continuity between ports A and C. Simultaneously, through the means of connecting member 66, valve 21 is caused to open. It should be obvious that the arrangement shown in FIG. 5 can also be used to operate valve pair 32 and 36 (FIG. 2).

The apparatus shown in FIG. 5 removes the necessity for operator detection of the filling of the gas housing chambers 19 and 34 and, therefore, improves the overall performance of the system by making it semiautomatic. The operator needs only to rest the valves 17, 21, 32 and 36 in order to perform the flushing operation and then again reset these valves prior to obtaining a sample from another subject.

With reference to FIG. 6, there is schematically shown a means for further reducing the human factor in judging the proper filling of the gas housing chambers 19 and 34. A chamber 19 is shown having a piston 30 therein. The chamber is provided with a pressure tap 68 attached, via tube 70, to a pressure transducer 72 such as a strain-gauge pressure sensor. When the piston moves beyond the position of the tap 68, a change in breath pressure is sensed by the pressure transducer. The electronic pressure sensor could then be used to operate the valves 17, 21, 32, and 36 by solenoid action. Resetting and flushing is then easily and automatically performed by such means as an additional pressure-sensing tap for indicating the emptying of the chamber and for initiating the reset of valves 17, 21, 32, and 36 and the opening of valve 44.

With reference now to FIG. 7, a further embodiment of the present invention is shown, this embodiment eliminating all electronic and electromechanical components and substituting therefor fluidic logic components. Since the embodiment shown in FIG. 7 is very similar to the embodiment shown and described in FIG. 2, like members are similarly referenced. With particular reference, then, to FIG. 7, the subject 10 exhales through a mouthpiece 12 feeding a check valve 15. After emerging from the check valve 15, the breath from the subject 10 reaches a fluid switching element 74. This element 74 is so designated that air entering port F initially flows out of port G exclusively. Therefore, the air fills the chamber 19 through a check valve 76, valve 21 then being closed. Once the chamber 19 is filled to a predetermined volume, the air is directed back to the fluid logic device 74 by means of a port 78 in the chamber 19 and a fluid transmission line tube 80. This feedback air causes the logic element 74 to switch the air flow from port G to port H. As a result, the breath from the subject 10 is directed to a second logic element 82 which is in the mode wherein the air initially flows exclusively through port J, passes to a check valve 84, and fills the chamber 34. When the chamber 34 is filled to the desired volume, air from the chamber is directed back to the logic element 82 in a manner like that described above with reference to chamber 19. This action causes the diversion of breath from port J to port K of the logic element 82. And, in turn, the air flow from port K of element 82 causes a further logic element 86 to switch from port M to port N thereof. This operation causes air from the pump 46 to flow out port N of logic element 86 and to operate the valves 21 and 36, respectively, and to initiate operation of the gas analysis device. These mechanical operations are accomplished by means of transducers 88, 90, and 92 associated, respectively, with the valve 36, the gas analysis device 16, and the valve 21, these transducers converting air pressure and flow into mechanical motion. When transducer 90 is activated, a pressure wave is fed back to the logic element 86 resetting its flow through port M.

It is contemplated that valves 21 and 36 be such that they remain open until they are reset manually. In this manner, flushing is accomplished in a way similar to that disclosed with reference to FIG. 2, by opening the valve 44 and permitting the system to perform the identical sequence of operations above described with reference to the breath-sampling operation.

Two additional air lines are included in the embodiment shown in FIG. 7. These air lines are indicated at 94 and 96, these lines serving, respectively, to provide feedback paths for insuring the maintenance of flow through port H and through port K of the respective logic elements 74 and 82 once flow has been initiated through these ports. This prevents an accidental "tripping" of the elements 74 and 82.

There has been described a method and an apparatus for the analysis of breath which avoids many of the drawbacks associated with methods and devices known to the prior art. More particularly, the present invention allows for the integration of various components so that automatic and reproducible results are perfected in the collection and analysis of breath samples. Also, means are provided for the separation of alveolar air from "dead air," these means including separate chambers for the collection of alveolar air and "dead air." In addition, there has been disclosed a breath analysis system having means incorporated therein for flushing the system in order to avoid the intermixture of breath between two consecutively tested subjects. Also, there are provided means including timing and gating circuits for selecting only the gas component pulse which corresponds to the particular gas under test. And finally, there has been disclosed a device for accomplishing the above-noted operations either manually, mechanically, electromagnetically, or with fluidic valving.

It should be noted, however, that the above description is given for illustrative purposes only and that there exist numerous equivalent and alternative manners of carrying out the teachings of the present invention. Therefore, it is the intent that the scope of the present invention not be limited to the above, but only as defined in the appended claims.

What is claimed is:

1. A method for analyzing the content of breath from a subject under test and comprising the steps of having the subject under test breathe into a collector tube; collecting a predetermined volume of breath in a first chamber, said predetermined volume being an estimate of the volume of the "dead air" spaces of the respiratory tract of the subject; collecting a further volume of breath in a second chamber in such a manner that said first-collected predetermined volume is kept separate from said second-collected further volume of breath; feeding said further volume of breath to a gas analysis device; analyzing the chemical content of the breath reaching said gas analysis device; and flushing, with a gas, the first and second chambers after each breath sampling is perfected.

2. The invention as recited in claim 1 wherein means are provided for controlling which of the first or second chambers is collecting breath.

3. An apparatus for collecting and analyzing the content of breath from a subject under test and comprising input means through which the subject under test exhales;

first collection means for gathering a predetermined quantity of breath from the subject, this predetermined quantity being an estimate of the volume of the "dead air" spaces of the respiratory tract of the subject under test;

second collection means for gathering a further quantity of breath from the subject;

first switching means positioned intermediate said input means and said first collection means and also positioned intermediate said input means and said second collection means, said first switching means serving to control the flow of breath from the subject under test to either said first or said second collection means;

first valve means providing for the release of breath from said first collection means;

second switching means positioned intermediate said input means and said second collecting means and also positioned intermediate said input means and an exhaust valve, said second switching means serving to control the flow of breath from the subject under test to either said second collection means or to said exhaust valve;

a gas analysis device for receiving and analyzing the gas content of the breath from said second collection means; and second valve means for controlling the flow of breath between said second collection chamber and said gas analysis device.

4. The apparatus of claim 3, wherein said first and second collection means are chambers provided with means for indicating when the breath therein is of a predetermined volume.

5. The invention recited in claim 3, and further comprising means for flushing the apparatus with a gas so that there is no intermixture of breath between two consecutively tested subjects.

6. The invention as recited in claim 3, wherein said first and said second switching means are mechanical selector valves each having an input port and a pair of selectively operated output ports.

7. The apparatus as recited in claim 3, and further comprising circuit means associated with the output of said gas analysis device for indicating the integral of the output pulse of interest, said circuit comprising:

a timer for receiving an electrical trigger signal from said gas analysis device and for initiating a control signal a predetermined time after receipt of said trigger signal; an "AND" gate for receiving said electrical trigger signal from said gas analysis device and said control signal from said timer, said "AND" gate passing said electrical trigger only when simultaneously receiving said trigger and said control signals; an integrating meter for receiving said electrical trigger signal from said "AND" gate and for displaying the integral of said signal; and level-sensing means for detecting the completion of said signal from said gas analysis device and for resetting said timer upon the completion of said signal.

8. The invention as recited in claim 3, wherein said first and second switching means are fluid-operated switching elements each having a fluid input port and a pair of selectively operated fluid output ports.

9. The apparatus of claim 8, wherein said switching operation associated with said first and second switching means is controlled by means of a fluid path between said switching means and the respective collection means.

10. The apparatus recited in claim 3 and further comprising first means for controlling the operation of said first switching means; and second means for controlling the operation of said second switching means.

11. The invention of claim 10, wherein first controlling means simultaneously operates said first switching means and said first valve means and wherein said second controlling means simultaneously operates said second switching means and said second valve means.

12. The invention of claim 11, wherein said simultaneous switching is perfected through the means of mechanical linkages.

13. The invention of claim 11, wherein said simultaneous switching is perfected through the means of electromechanical solenoids.

14. The invention of claim 13, wherein said solenoids are activated by means associated with the collection means and which activate said solenoids only after said collection means are filled to a predetermined volume.

* * * * *